(12) United States Patent
Haggar et al.

(10) Patent No.: US 6,842,759 B2
(45) Date of Patent: Jan. 11, 2005

(54) SINGLE-INSTANCE CLASS OBJECTS ACROSS MULTIPLE JVM PROCESSES IN A REAL-TIME SYSTEM

(75) Inventors: Peter F. Haggar, Raleigh, NC (US); James A. Mickelson, Cary, NC (US); David Wendt, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 10/050,272

(22) Filed: Jan. 16, 2002

(65) Prior Publication Data

US 2003/0135658 A1 Jul. 17, 2003

(51) Int. Cl.$^7$ .............................................. G06F 17/30
(52) U.S. Cl. .................... 707/103 R; 707/206
(58) Field of Search ......................... 707/103 R, 206; 710/33; 711/132; 714/38; 717/107, 126, 128, 131, 148, 152, 154; 718/108; 719/315, 328, 330, 331, 332

(56) References Cited

U.S. PATENT DOCUMENTS

| | | | |
|---|---|---|---|
| 5,822,580 A | 10/1998 | Leung ..................... 707/103 R |
| 5,943,496 A | 8/1999 | Li et al. ..................... 719/328 |
| 5,974,439 A | 10/1999 | Bollella ..................... 709/104 |
| 6,044,217 A | 3/2000 | Brealey et al. ............. 717/107 |
| 6,093,216 A | 7/2000 | Adl-Tabatabai et al. ....... 717/3 |
| 6,173,439 B1 | 1/2001 | Carlson et al. .............. 717/1 |
| 6,192,517 B1 | 2/2001 | Agesen et al. ............... 717/9 |
| 6,199,197 B1 | 3/2001 | Engstrom et al. ............ 717/2 |
| 6,202,208 B1 | 3/2001 | Holiday, Jr. ................. 717/11 |
| 6,223,202 B1 | 4/2001 | Bayeh ........................ 709/102 |
| 6,240,498 B1 | 5/2001 | Dickes et al. ............... 711/170 |
| 6,256,773 B1 | 7/2001 | Bowman-Amuah ........... 717/1 |
| 6,272,674 B1 | 8/2001 | Holiday, Jr. ................. 717/1 |
| 6,374,286 B1 * | 4/2002 | Gee et al. ................... 718/108 |
| 6,421,739 B1 * | 7/2002 | Holiday ...................... 719/330 |

FOREIGN PATENT DOCUMENTS

WO    WO 00/52572    9/2000

OTHER PUBLICATIONS

Bollella et al. "*The Real–Time Specification For Java* ™", Addison–Wesley, 2000.

* cited by examiner

*Primary Examiner*—Diane D. Mizrahi
*Assistant Examiner*—Apu M Mofiz
(74) *Attorney, Agent, or Firm*—Synnestvedt & Lechner LLP; Gregory M. Doudnikoff

(57) ABSTRACT

A method, system, and computer program product for sharing memory resources between several JVM processes. According to the present invention, Java software applications are loaded into a JVM in a manner suited for real-time server applications. When a JVM process is run, memory areas are created. For the initial JVM process, a heap memory area is assigned, and two separate class memory areas are created. One class memory area is reserved for the application class information, while a separate class memory area is created to hold the system class designations. The system class memory area can be shared by any subsequent JVM processes.

28 Claims, 4 Drawing Sheets

SINGLE-INSTANCE CLASS OBJECTS ACROSS MULTIPLE JVM PROCESSES IN A REAL-TIME SYSTEM

FIELD OF THE INVENTION

The present invention relates to computer resource sharing. More particularly, it deals with sharing memory area between several Java Virtual Machine (JVM) processes in a real time Java environment.

BACKGROUND OF THE INVENTION

The past several years have brought drastic changes to the field of computer processing. Rapidly changing technology has altered the fundamental paradigms within which creators of computer software operate. One of the most significant changes was the change in the theory under which software was developed, from function based programs to object based programs. This gave rise to the development of new programming languages known as object-oriented languages, such as Smalltalk, C++ and Java.

Object-oriented program concepts were designed to improve the performance of application software. The goal of object-oriented programming is to create small, reusable sections of program code known as "objects" that can be quickly and easily combined and reused to create new programs. This is similar to using the same set of building blocks over and over to create many different structures.

Central to the concept of object-oriented programming is the idea of the "class." A class is a template that defines a type of object. A class defines the characteristics of the objects which belong to that class. Individual objects can be created which belong to a particular class without the need to rewrite all of the defining characteristics of each new object. An individual object created in a particular class is known as an "instance" of a particular class.

Java ("Java" is a trademark of Sun Microsystems, Inc.) has become one of the most popular object-oriented programming languages. The Java programming language is a robust portable object-oriented language. Java was designed such that Java code could operate with any of the wide variety of currently existing platforms. A Java program is created by compiling source code written in Java format (files with a .java extension) into Java bytecodes (files with a .class extension). Java bytecodes are machine independent representations which can be executed by a runtime Java interpreter. Run time activities include loading and linking the classes needed to execute a program, dynamic optimization of the program, and actual program execution.

Compiled Java code can run on most computers where Java interpreters and runtime environments exist for the operating system used. These programs are combined as part of the software referred to as a Java Virtual Machine (JVM). The JVM is an abstract computing machine that has an instruction set and uses various memory areas. A JVM is not an actual hardware platform, but rather a low level software emulator that can be implemented on many different computer processor architectures and under many different operating systems. The JVM reads and interprets each bytecode so that the instructions may be executed by the host microprocessor. In this manner, a compiled Java program is capable of functioning on any platform that has a JVM implementation available.

Object-oriented systems such as Java contain a large storage area which may be allocated into smaller memory areas when needed by the program. This memory area is known as a "heap." Heap allocation allows memory for objects to be allocated and de-allocated in any order, and these objects in the heap memory can outlive the procedure which created them. A memory allocated in a heap is called a "node."

In non-Java applications, heap memory is used by manually programming node allocation and de-allocation. The programmer knows when a new node will be required; however, he does not always know when a node is no longer needed. As a result, problems can occur when programmers need to manage the memory heap and explicitly de-allocate nodes. One way in which JVMs rectify this problem is by using "dynamic memory management."

Dynamic memory management is a process by which a JVM manages the allocation and deallocation of the nodes contained within the heap; thus, removing the need for the programmer to explicitly perform this task. This is done by using an automatic scan of the memory to reclaim memory nodes which were allocated from the heap but are no longer needed. This process is known as "garbage collection." The garbage collection process is periodically invoked in response to some condition (e.g., expiration of a clock), and the garbage collection method scans the heap and reclaims unused memory for subsequent reuse.

Each JVM process maintains its own heap memory area. Within the heap, classes and instances of the classes are stored. Class objects can be further divided into two sets. The first set comprise those classes which are used to execute a Java application. These are the classes which are pre-defined by the JVM and do not change with various applications, and are called "system classes." System classes are loaded when a Java application is started, and they are never unloaded, or garbage collected, as long as the application is running.

The second set of classes are the "application classes." These classes are unique to the application, and are designed by the programmer of the application. These classes are loaded when needed, and the memory they are stored in is subject to garbage collection when they are no longer needed.

System classes, application classes, and instances are all contained with the heap for each JVM process. The memory allocation of a system running several JVM processes is shown in FIG. 1.

FIG. 1 is a diagram illustrating how memory areas are allocated by JVM processes. The system memory resources 100 are allocated into memory areas by the JVM processes. Each JVM process creates a heap memory area (101, 102, 103) when the process is initially executed. Within the defined heap, all class definitions and class instances are stored. Thus, system classes, application classes, and class instances will all reside within the heap. The programmer does not need to be concerned with memory management, because the JVM process will automatically allocate memory when needed for a class definition or a class instance. Periodically, the heap memory is subject to garbage collection whereby the JVM process identifies memory locations which are no longer needed, and deallocates them. This returns these locations to the heap where they can be used again as the JVM process needs to allocate additional memory locations.

Because of its many advantages, Java has become a preferred language for Web operations. It operates with several of the most common operating systems including Windows, Unix, Macintosh. However, these systems are not generally "real-time" systems. A real-time system is one which will respond to input in a bounded amount of time. They are used for such tasks as navigation, in which the computer must react to a steady flow of new information without interruption. Most general-purpose operating systems are not real-time because they do not impose time constraints on processing.

Recently, there has been a desire to bring the benefits of Java to real-time computing applications. One of the problems encountered was that the method used by JVM processes to manage memory heaps was not conducive to the real-time environment. The process of garbage collection results in non-deterministic (and thus less predictable) behavior which has discouraged the use of Java in real-time applications. When a garbage collection process is occurring to reallocate the heap memory, the processor is occupied with the garbage collection. This creates a problem in a real-time system, where the processor must, by definition, be able to react in a predictable manner without missing deadlines. Garbage collection creates unpredictable execution latencies which can be disruptive to real time systems.

To overcome the obstacles of implementing Java in real-time environments, the Real-Time Specification for Java (RTSJ) (Copyright 2000 Addison-Wesley) was created by a team of experts in the fields of Java and real-time computing. This specification addresses the concerns with using the Java language in a real-time environment, and is incorporated herein by reference. RTSJ specifies the areas of Java which previously were not conducive to real-time applications, for example, predictability and memory management.

One of the many areas addressed by RTSJ was the concern with the heap memory allocation. RTSJ specifies that "[e]ach instance of the virtual machine will behave as if there is an area of memory into which all Class objects are placed and which is unexceptionally referenceable by NoHeapRealtimeThreads." A thread is a small executable part of a program which can operate independently from other parts. A NoHeapRealtimeThread is a thread which runs without accessing any objects that may be subject to garbage collection. This requirement removes the classes from the heap and places them in an area which is not subject to garbage collection. This area is called the class memory area.

Because of the system of garbage collection, the definition of memory areas as shown in FIG. 1 does not provide an optimal system for a real-time environment. Using a memory area defined as shown in FIG. 1 does not adhere to the requirements of RTSJ. In order to comply with the requirements of RTSJ, the memory areas have been modified as shown in FIG. 2. In FIG. 2, the system memory resources 200 are allocated into separate heap memory areas and class memory areas by the JVM processes. The heap memory areas (202, 204, 206) containing the class instances are subject to garbage collection. However, the class memory areas (201, 203, 205) containing the definition of the system classes and application classes are not subject to garbage collection.

As shown in FIG. 2, all of the classes are segregated into a separate class memory area located outside of the heap memory area that stores the class instances. In the prior art configuration of FIG. 2, the system classes and application classes both exist within the class memory area.

The definition of the memory area as shown in FIG. 2 resolves the concern with garbage collection and RTSJ because it removes the classes from the heap memory area and places them in a separate area which is not subject to garbage collection. However, defining the memory area as diagramed in FIG. 2 is resource consuming, as the class memory areas are not subject to garbage collection and reallocation, and thus each JVM process allocates a full class memory area within the system memory resources 200.

It would be desirable to reduce the amount of memory needed by the JVM processes outside of the heap area (i.e., in the class memory areas), as this memory is no longer subject to garbage collection. Each JVM process creates its own class memory area. The class memory area consists of the system classes and the application classes, while the instances remain in the heap memory area. System classes are those classes set out by the JVM and do not change with the various applications. Thus, the system classes for every JVM process are identical. The application classes are dependent upon the application; thus, they would not be the same across more than one JVM process unless two JVM processes were running the same application.

Creating a way by which several JVM processes could share system classes would eliminate the need to have a separate system class memory area for every JVM process. This would reduce the total amount of memory resources which would be needed by the various JVM processes. When several applications or JVM processes are operating at the same time, this would create a significant reduction in the memory area required and allow for a more efficient use of the system resources. Thus, it would be desirable to create a system to allow the a single loading of the system classes into a class memory area and then to allow any subsequent JVM processes to access this memory area and the currently loaded system classes.

SUMMARY OF THE INVENTION

The present invention describes a method, system, and computer program product for enabling memory resources to be shared between several JVM processes. According to the present invention, Java software applications are loaded into a JVM in a manner suited for real-time server applications. When a JVM process is run, memory areas are created. For the initial JVM process, a heap memory area is assigned, and two separate class memory areas are created. One class memory area is reserved for the application class information, while a separate class memory area is created to hold the system class designations.

Any subsequent JVM processes that are executed check to see if a system class memory area exists. Upon the determination that a system class memory area has already been created by a previous JVM process, the subsequent JVM process references the existing system class memory area for system class definition.

The shared system class area remains loaded until all of the accessing JVM processes are unloaded. Once all of the accessing JVM processes are unloaded, the shared memory area is freed.

DETAILED DESCRIPTION OF THE INVENTION

Figure 1:
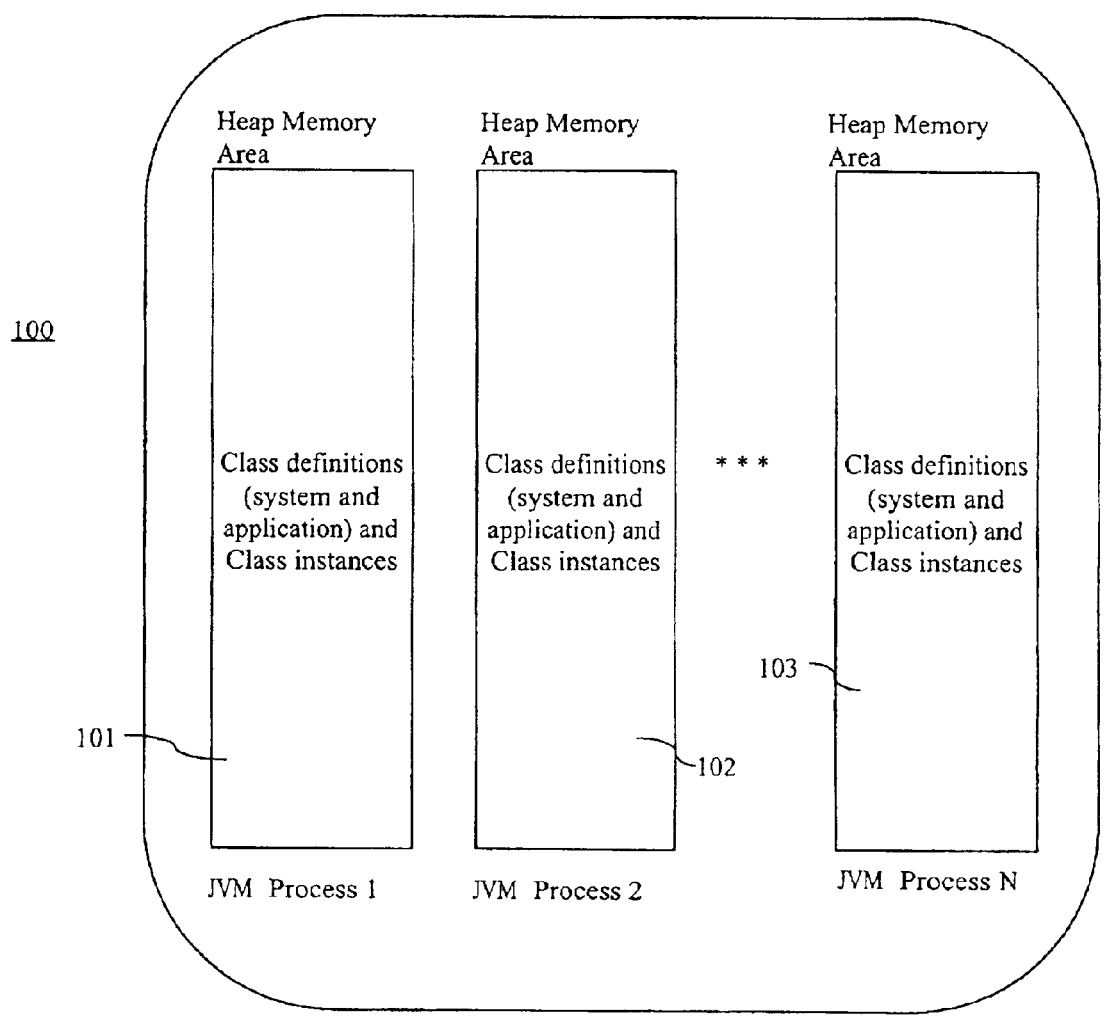
FIG. 1 is a diagram showing the allocation of memory areas in a typical JVM environment.
Figure 2:
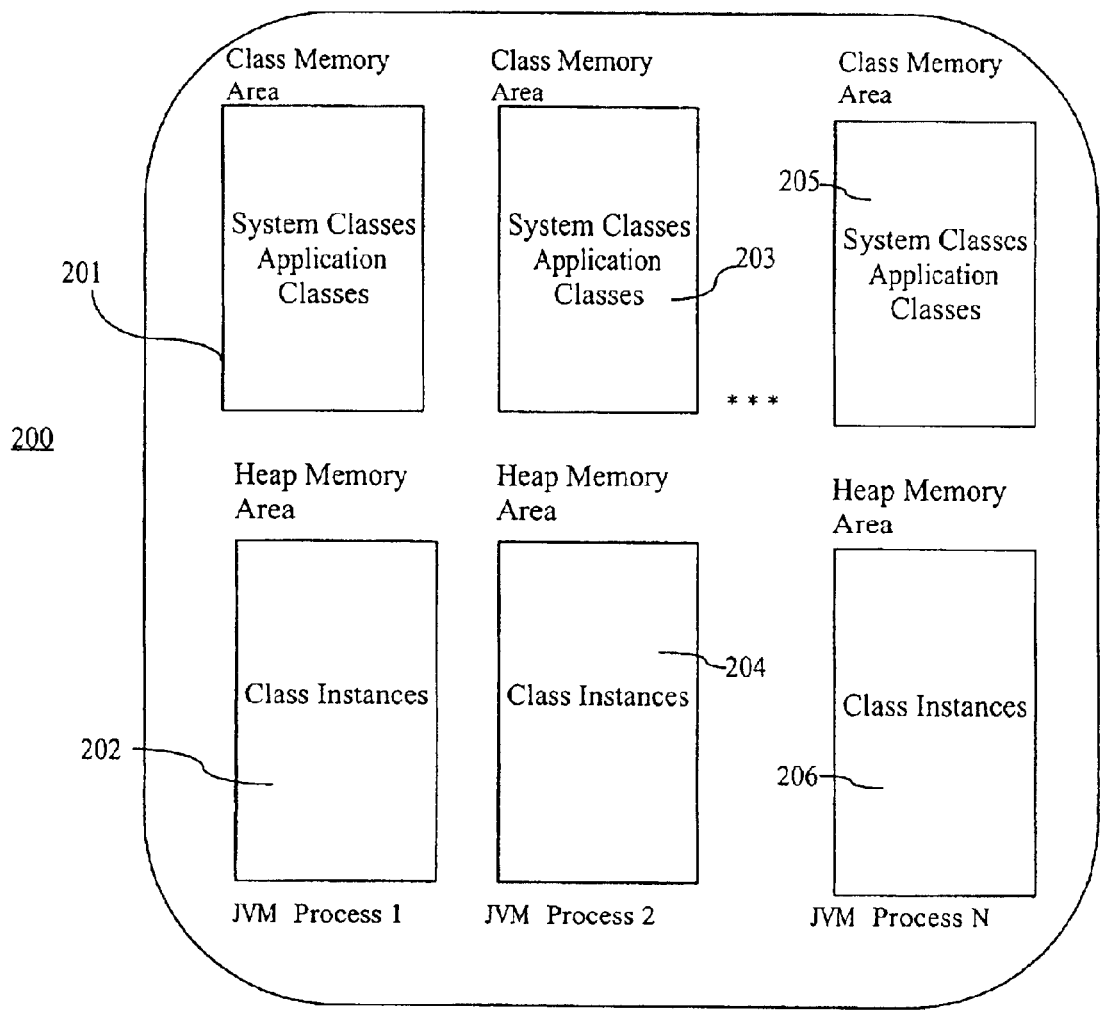
FIG. 2 is a diagram showing a modification to the memory areas shown in FIG. 1 resulting in a memory allocation scheme which complies with the Real Time Specification for Java.
Figure 3:
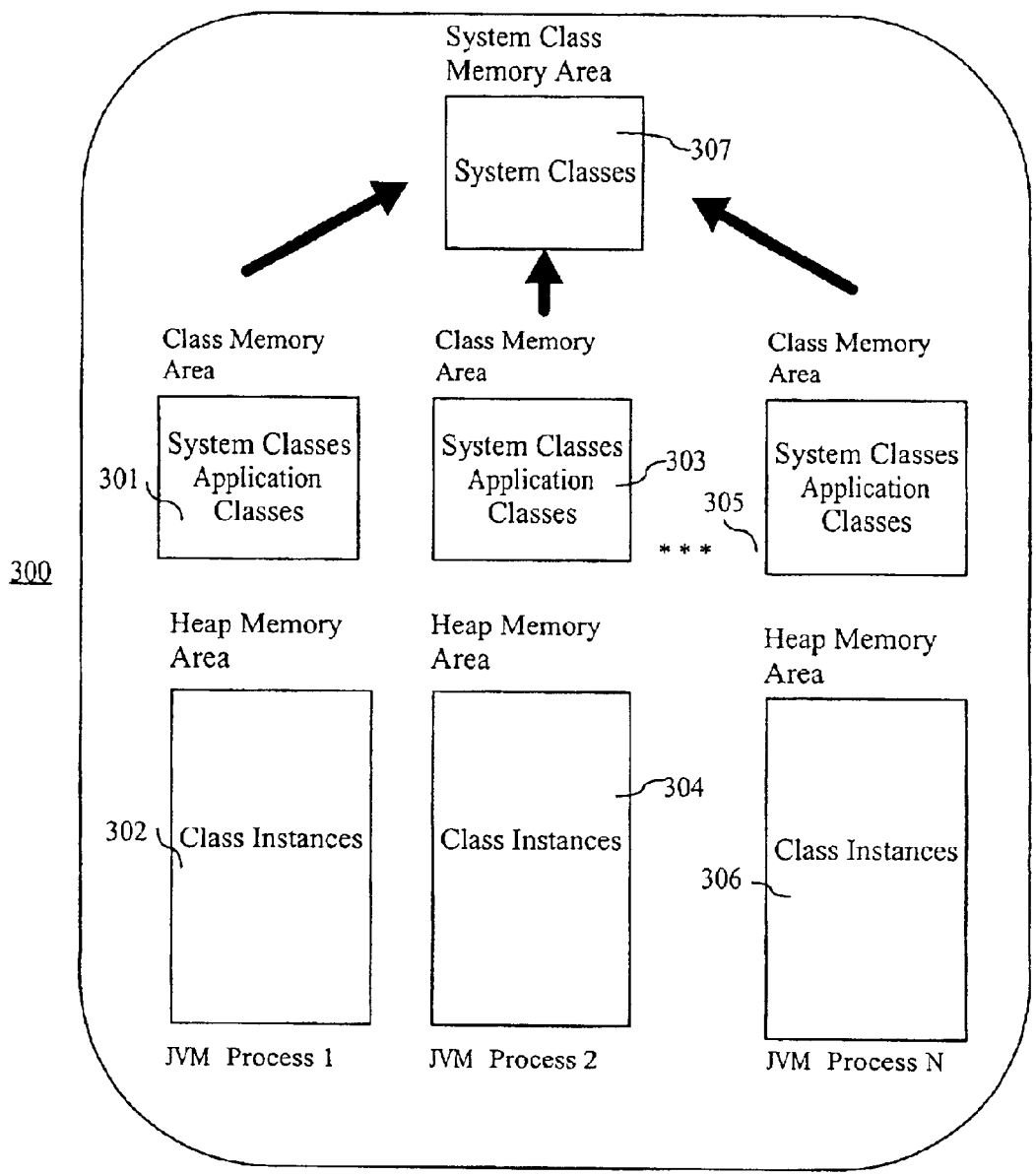
FIG. 3 is a diagram of the memory areas in accordance with the present invention, in which the system class memory area is shared between several JVM processes.

The present invention described herein allows duplicative memory areas to be eliminated. In accordance with the present invention, the class definitions of a JVM process are divided into application classes and system classes. The system classes, which are identical for all of the JVM processes, are stored in a single system class memory area that is shared between all of the JVM processes running at any one time. FIG. 3 depicts a memory allocation scheme in accordance with the present invention. As shown in FIG. 3, each JVM process maintains its own class instance memory area (302, 304, 306) and application class memory area (301, 303, 305). The system class memory area 307, however, is shared by all of the JVM processes.

In order to segregate the system class memory into a separate memory area which can be shared among several JVM processes, it is necessary for the JVM to identify the system classes and to be able to distinguish them from the class definitions which are application specific. Several methods are available for performing this function. The system class names can be hard coded in each JVM process to allow for them to be easily identified by the JVM process. Another method is to place a marker into the system class definitions to allow them to be identified. A preferred method is to keep a list of the system classes in a registry which identifies them to the JVM process when the memory areas are allocated. This method is preferred because it allows for modification of the system classes by editing the registry without having to make any changes within the individual JVM applications. In order to designate an additional system class, only the registry needs to be modified.

In addition, within some systems, some of the application classes are consistent between all of the JVM processes. In this event, these class definitions can be identified in the registry, marking these application classes as if they were system classes so they also can be allocated to the shared memory area.

Once identified, the system classes are segregated from the application classes and class instances and can be placed in a separate memory area 307. This separate memory area contains class definitions which will be applicable to all independent JVM processes which might be executed. Thus, by using the present invention, subsequent JVM processes do not need to create a duplicate of these class definitions, as they can be directed to the existing memory area already allocated. This creates a shared system class memory area 307.

Figure 4:
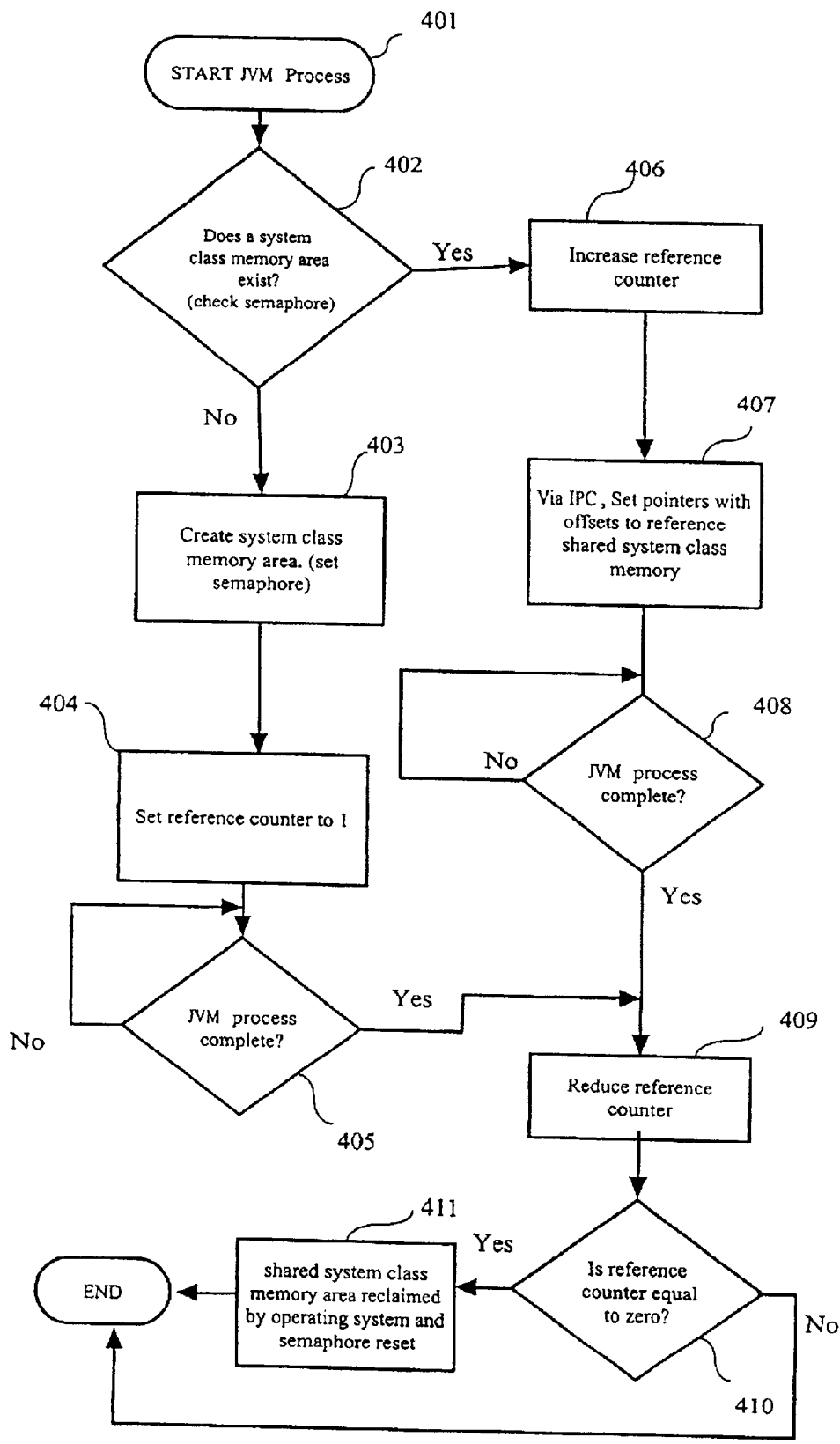
FIG. 4 is flow chart showing an example of a process in accordance with the present invention which achieves the desired shared memory allocation as shown in FIG. 3.

FIG. 4 is a flowchart illustrating an example of the process functions which will perform the process of the present invention. A JVM process is initiated at step 401, and at step 402 a check is performed to determine if a shared class memory area is exists in memory. This is achieved by using a flag, or semaphore, to "notify" any JVM processes of the existence of a shared class memory area. A semaphore is set once the initial JVM process executes and defines the shared class memory area. The semaphore is not reset until the final JVM process is completed and the shared class memory area is freed.

When the initial JVM process is executed, the semaphore value will indicate that no shared memory area is defined. Thus, at step 403, the JVM process defines a system class memory area. The initial JVM process also sets the semaphore so that subsequent JVM processes can identify that a system class memory area exists and thus not attempt to define one.

When a subsequent JVM process is executed, the semaphore indicates that a shared system class memory area exists. Upon determining the existence of the shared class memory area, the subsequent JVM process references the shared memory class area, as described in more detail below with reference to steps 406, 407, and 408. This can be accomplished via inter process communication (IPC). The subsequent JVM process maps the location of the shared class memory area to its address space. Thus, the subsequent process has access to a full set of system classes loaded without actually having loaded the system classes from disk into a separate system class memory area exclusive to the subsequent JVM process. This also results in the start-up time for the subsequent JVM processes being less than the start-up time for the initial JVM process because the subsequent JVM processes do not need to spend time to allocate a system class memory area.

With more than one process accessing the system class memory area, a reference count must be maintained to manage the lifespan of the shared resource. A reference count is a variable used as a means of determining when the shared resource is in use. Each time a JVM process that will access the shared system class memory area is launched, the reference counter is adjusted to reflect the additional process. Each process which exits causes a corresponding adjustment. This allows the system to know when there are no longer any processes using the shared resource, thereby allowing the memory area to be reclaimed. For example, when JVM process A (an initial JVM processes) executes, a reference counter variable is set to one (step 404). When JVM process B begins, the reference counter variable is increased to two (step 406). When JVM process C begins, the counter is increased to three (step 406). When JVM process A ends, the reference counter is reduced to two to reflect the end of a JVM process (step 409). When a second JVM process ends (e.g. JVM process C), the reference counter is reduced to one. When the reference counter reaches zero (step 410), the shared memory area is reclaimed (step 411).

As described above, once a JVM process has created a shared memory area for the system classes, the objects in the shared memory area are available to the initial and all subsequent JVM processes. This is accomplished by mapping the location of the shared class memory area to the subsequent JVM processes. To do this, pointers are set to map the particular JVM process to the system classes located within the shared memory area.(407) By using pointers, the need to create additional system class definitions for each JVM process is eliminated. Each JVM process executed after the initial JVM process can share the system class memory designation allocated by the initial JVM process.

In the preferred embodiment, offsets are used to resolve pointers for objects within the shared memory area. In a manner well known in the art, each process can utilize a unique address to access the memory and the JVM logic can incorporate an offset to the memory address to allow several JVM processes to access the same system class object within the shared memory area. A pointer address used by a particular JVM process is modified with an offset to allow multiple processes to reference the shared memory area.

While the various JVM processes are running, the shared memory area remains allocated. Once the last JVM process has completed, the reference counter will reach zero. At that point, the system class memory area is deallocated. The semaphore is reset, and the memory areas are ready for allocation by any future JVM process.

The present invention provides a means to share memory resources among several JVM processes. By separating system classes from all other class definitions and placing the system classes in an area which can be shared among many JVM processes, the amount of memory resources used is reduced. In addition, the startup times for all JVM processes executed subsequent to the initial process will be reduced, as they will not have to allocate a system class memory area.

Furthermore, by creating a shared system class memory area outside of the areas subject to random garbage collection, the present invention is compliant with the Real-time Specification for Java. This results in the JVM processes having the additional benefit of more predictable behavior.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

We claim:

1. In a computer system operating in compliance with Real Time Specification for Java (RTSJ), a method of sharing memory resources between a plurality of JVM processes comprising the steps of:
   a) allocating a memory area to store class data by a first JVM process;
   b) storing class data in said memory area by said first JVM process;
   c) determining if said memory area is allocated by a second JVM process;
   d) accessing and utilizing said class data from said memory area by said second JVM process.

2. A method as set forth in claim 1, wherein the step of allocating a memory area to store class data by a first JVM process further comprises the step of setting a semaphore to notify subsequent JVM processes of the existence of a class memory area.

3. A method as set forth in claim 1, wherein the step of accessing and utilizing said class data from said memory area by said second JVM process further comprises the steps of:
   a) identifying the location of the class memory area by said second JVM process;
   b) said second JVM process communicating with the first JVM process via IPC to reference the class data stored in the class memory area.

4. A method as set forth in claim 1, further comprising the steps of:
   separating the class data into application classes and system classes;
   storing the system class data in the said memory area.

5. The method as set forth in claim 1, wherein a reference counter is used to determine when all JVM processes have exited.

6. The method as set forth in claim 1, wherein said at least one second JVM process accesses said memory area by mapping the said memory area to the second JVM process using pointers.

7. A computer program product for sharing memory resources between a plurality of JVM processes operating in compliance with the Real Time Specification for Java (RTSJ), comprising computer executable instructions for:
   allocating a memory area to store class data by a first JVM process; and
   accessing said memory area by at least one second JVM process.

8. A computer program product as set forth in claim 7, further comprising computer executable instructions for:
   separating the Java class data into application classes and system classes; and
   storing the system class data in the said memory area.

9. A computer program product as set forth in claim 7, further comprising computer executable instructions for identifying the existence of a system class memory area by using a semaphore.

10. A computer program product as set forth in claim 7, further comprising computer executable instructions for determining when all JVM processes have exited.

11. In a computer system, a method for sharing memory resources between a plurality of JVM processes comprising the steps of:
    separating class data into system class data and application class data;
    allocating a system class memory area to store system class data by a first JVM process;
    storing said system class data in said system class memory area;
    identifying said system class memory area by a second JVM process; and
    accessing and utilizing said system class data from said system class memory area by said second JVM process.

12. A method as set forth in claim 11, wherein the step of allocating a system class memory area to store system class data by a first JVM process further comprises the step of setting a semaphore to notify subsequent JVM processes of the existence of a system class memory area.

13. A method as set forth in claim 11, wherein the step of accessing and utilizing said system class data from said system class memory area by said second JVM process further comprises at least the steps of:
    identifying the location of the system class memory area by said second JVM process; and
    said second JVM process communicating with the first JVM process via IPC to reference the system class data stored in the system class memory area.

14. A method as set forth in claim 11, further comprising the steps of:
    determining when all JVM processes have exited; and
    deallocating said system class memory area.

15. A method as set forth in claim 11, wherein the step of accessing and utilizing said system class data from said system class memory area further comprises at least the step of mapping said system class memory area to said second JVM process by using pointers.

16. A computer program product for sharing memory resources between a plurality of JVM processes, comprising computer executable instructions for:
    separating class data into system class data and application class data;
    allocating a system class memory area to store system class data by a first JVM process; and
    accessing said system class memory area by a second JVM process.

17. A computer program product as set forth in claim 16, further comprising computer executable instructions for identifying the existence of a system class memory area by using a semaphore.

18. A computer program product as set forth in claim 16, further comprising computer executable instructions for:
   determining when all JVM processes have exited; and
   deallocating said system class memory area.

19. A computer program product as set forth in claim 16, wherein the computer executable instructions for accessing said system class memory area by a second JVM process further comprise instructions for mapping the system class memory area to the second JVM process through the use of pointers.

20. A system for sharing memory resources between a plurality of JVM processes operating in compliance with the Real Time Specification for Java (RSTJ), comprising;
   means for allocating a class memory area to store class data by a first JVM process; and
   means for accessing said class memory area by a second JVM process.

21. A system as set forth in claim 20, further comprising:
   means for separating the Java class data into application classes and system classes; and
   means for storing the system class data in the said memory area.

22. A system as set forth in claim 20, further comprising a means for identifying the existence of a system class memory area through the use of a semaphore.

23. A system as set forth in claim 20, further comprising a means for determining when all of the JVM processes have exited.

24. A system as set forth in claim 20, wherein said second JVM process has a shorter start-up time than said first JVM process.

25. A system for sharing memory resources between a plurality of JVM processes, comprising;
   means for separating class data into system class data and application class data;
   means for allocating a class memory area to store class data by a first JVM process; and
   means for accessing said class memory area by a second JVM process.

26. A system as set forth in claim 25, further comprising a means for identifying the existence of a system class memory area through the use of a semaphore.

27. A system as set forth in claim 25, further comprising a means for determining when all of the JVM processes have exited.

28. A system as set forth in claim 25, wherein said second JVM process has a shorter start-up time than said first JVM process.

* * * * *